Aug. 4, 1942.  H. I. WILSON ET AL  2,291,999
TOOL HOLDER
Filed Oct. 16, 1939  3 Sheets-Sheet 1
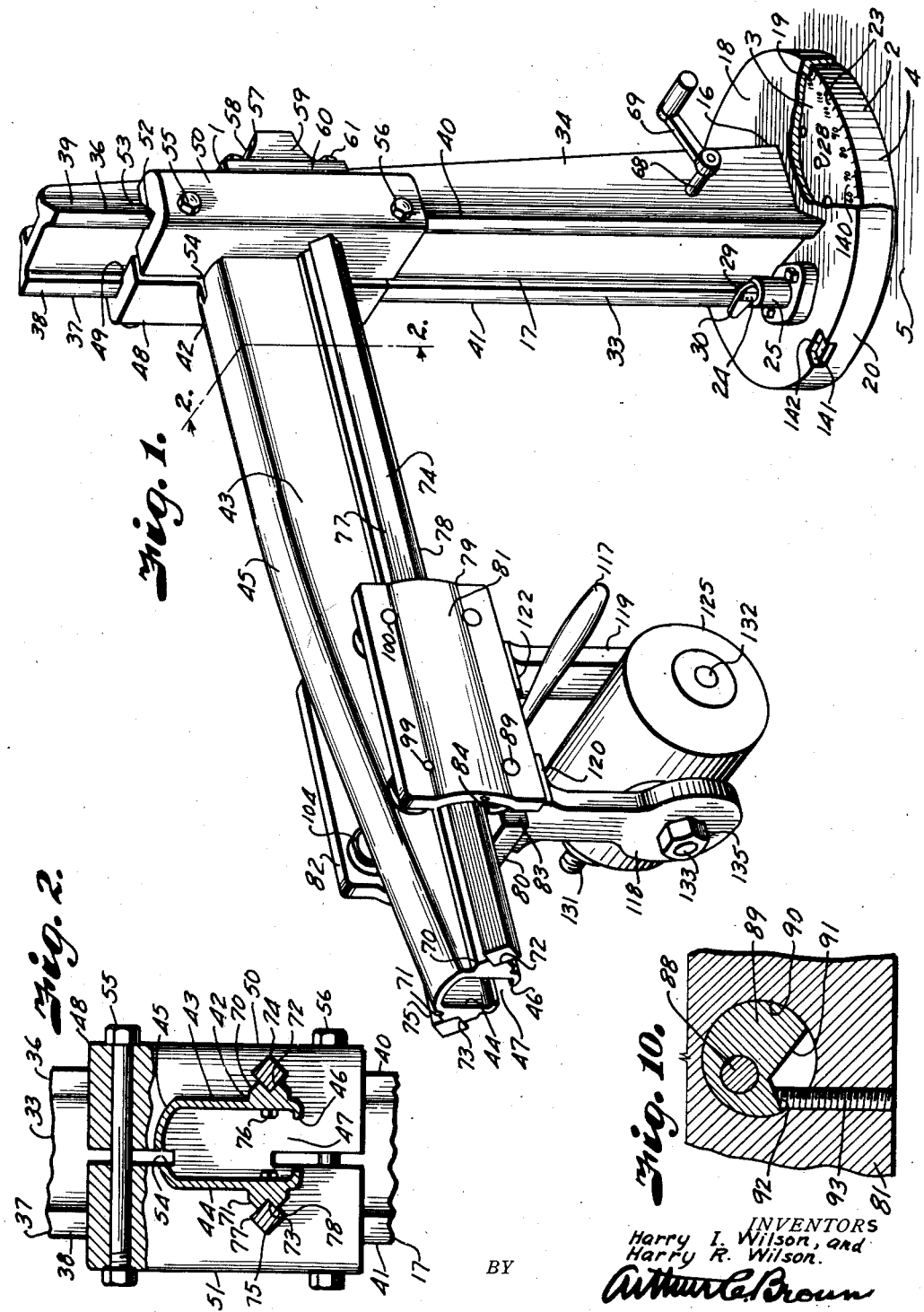
INVENTORS
Harry I. Wilson, and
Harry R. Wilson.
BY Arthur C. Brown
ATTORNEY

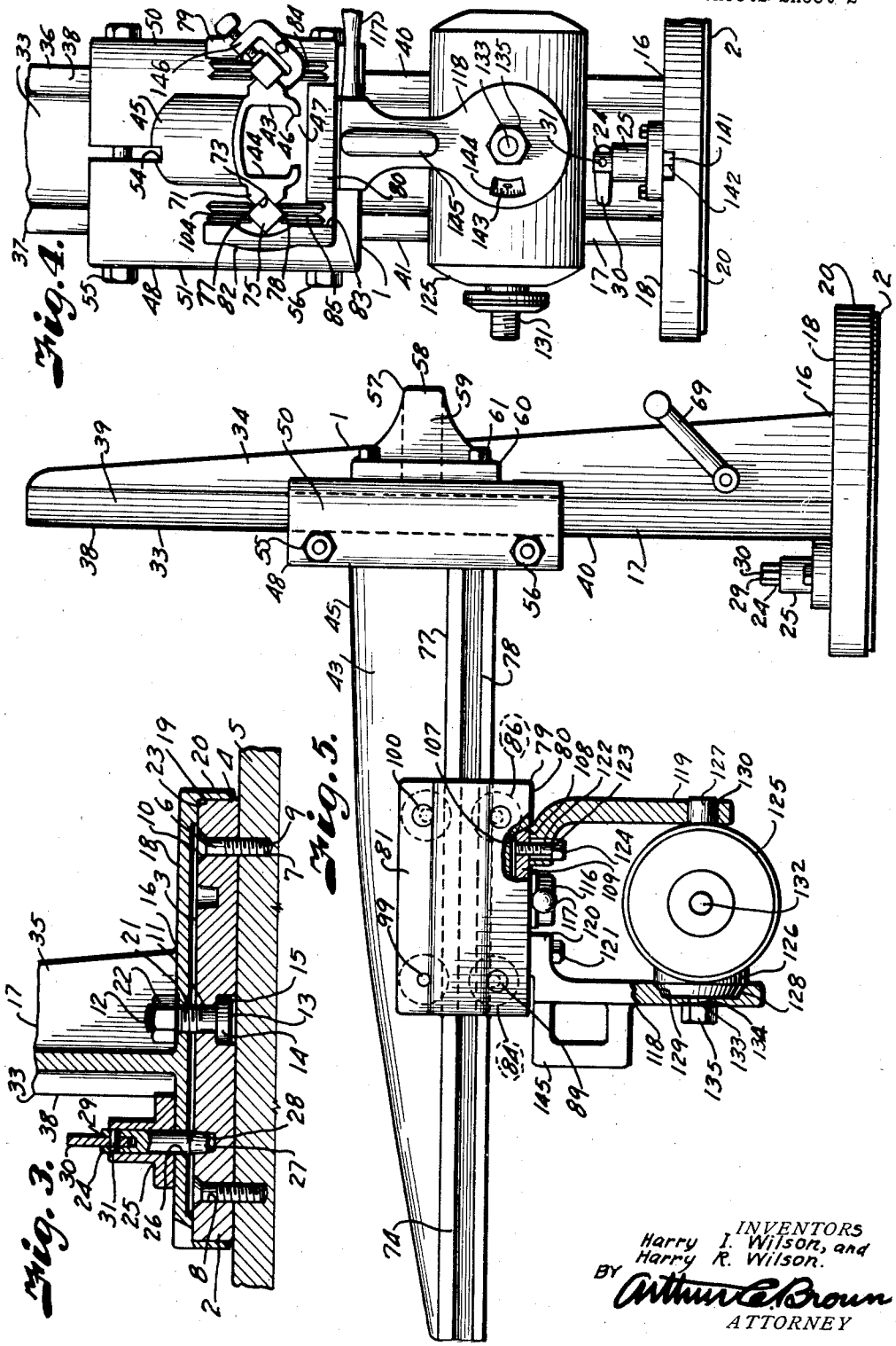

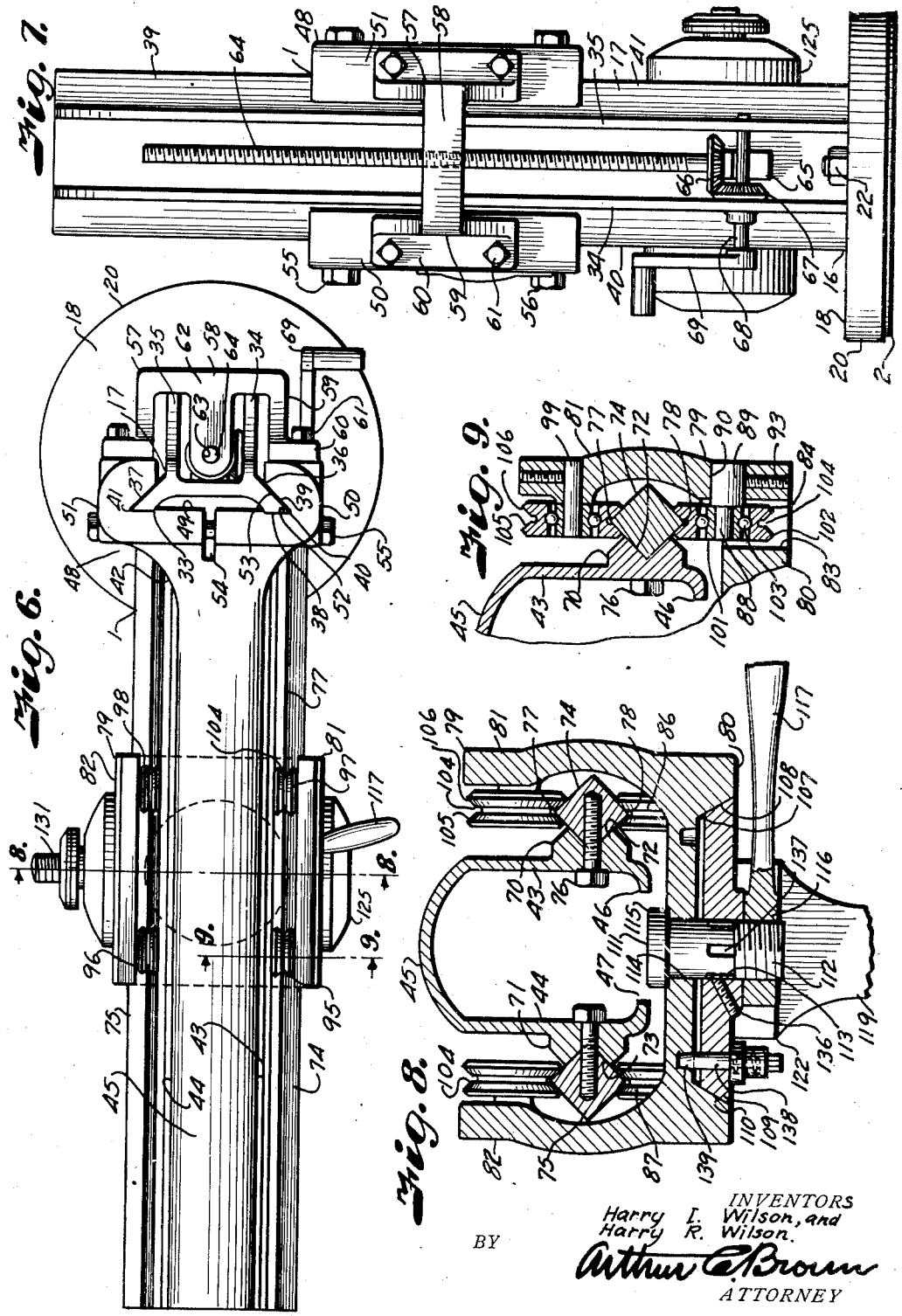

Patented Aug. 4, 1942

2,291,999

UNITED STATES PATENT OFFICE 2,291,999

TOOL HOLDER

Harry I. Wilson and Harry R. Wilson,
Kansas City, Mo.

Application October 16, 1939, Serial No. 299,609

4 Claims. (Cl. 248—2)

This invention relates to tool holders and particularly to an adjustable motor mounting whereby a tool driven by the motor may be readily moved to all positions necessary in performing a given piece of work, and has for its principal object to provide a mounting of this character that is extremely universal as to the number of positions of adjustment and which is designed for extreme rigidity after adjustment.

Other objects of the invention are to provide a motor mounting wherewith the motor is readily movable to any selected position; to provide a movable motor carriage that is readily manipulated with a minimum play; and to provide a motor mounting readily adjustable to various size motors.

In accomplishing these and other objects of the invention, as hereinafter pointed out, we have provided improved details of structure, the preferred form of which is illustrated in the accompanying drawings, wherein:

Fig. 1 is a perspective view of a motor driven tool mounting constructed in accordance with the present invention.

Fig. 2 is a cross-section through the carriage supporting arm of the device on the line 2—2 of Fig. 1, a part of the arm mounting plate being broken away to better illustrate the clamping devices for securing the arm to its supporting bracket.

Fig. 3 is a detail section through the base of the standard, particularly illustrating swivel mounting thereof.

Fig. 4 is a front elevational view of the motor mounting.

Fig. 5 is a side elevational view.

Fig. 6 is a plan view.

Fig. 7 is a rear elevational view.

Fig. 8 is an enlarged cross-section on the line 8—8 of Fig. 6, particularly illustrating roller mounting of the motor carriage on the horizontal supporting arm.

Fig. 9 is a detail section through one set of carriage rollers on the line 9—9 of Fig. 6, particularly illustrating adjustment thereof to take up wear and eliminate play incidental to any inaccurate alignment of the guide tracks on the supporting arm.

Fig. 10 is a section through one of the eccentrics.

Referring more in detail to the drawings:

1 designates a motor mounting constructed in accordance with the present invention, and which includes a trunnion or anchor plate 2 having a flat top 3 and a circumferential side face 4.

The trunnion plate 2 is adapted for attachment to a work table, foundation, or other suitable support 5 by means of fastening devices 6, such as screws, having shanks 7 projected through suitable openings 8 in the trunnion plate 2 and into threaded sockets 9 formed in the support 5. The heads 10 of the screws are preferably countersunk within the top of the trunnion plate as shown in Fig. 3. Formed in the axis of the trunnion plate is an opening 11 for passing the shank 12 of a trunnion bolt 13, having the head 14 thereof positioned in a counterbore 15 formed in the under side of the trunnion plate. The shank of the bolt is of sufficient length to project a material distance from the upper face of the trunnion plate for clampingly retaining a turntable 16.

The turntable 16 constitutes the base portion of an upright 17 and has a flat, disk-like portion 18 provided with an annular shoulder 19 on the under side, arranged to bear directly upon the annular edge of the flat top 3 of the trunnion plate 2. Depending from the periphery of the disk portion 18 is an annular flange 20 engaging the circumferential face 4. The center of the disk portion 18 has an opening 21 in the axis thereof to pass the shank of the trunnion bolt. Threaded on the projecting end of the bolt is a nut 22 cooperating with the head 13 to retain the turntable on the trunnion plate, with the shoulder 19 thereof in bearing engagement with the marginal edge 23 so that the upright 17 is adapted to rotate on a vertical axis.

In order to latch the turntable in adjusted position, we provide a pin or bolt 24 which is reciprocably supported in a collar 25 that is carried on the upper face of the disk-like portion of the turntable and which is adapted to project through an opening 26 therein so that a tapered end 27 of the bolt is adapted to engage in one of a circular series of tapered sockets 28 that are provided in the upper face of the trunnion plate. In order to move the bolt readily to and from engagement with any one of the sockets, the head thereof is slotted, as at 29, and carries an operating lever 30, which is pivoted in the slot on a pin 31 in such a manner that a cam-like head 32 thereon engages the upper end of the collar to effect retraction of the bolt when the lever is swung in a clockwise direction (Fig. 4). The turntable carrying the upright may then be rotated to bring the bolt 24 into registry with any one of the other sockets, after which the lever 30 is swung retractively to permit settling of the tapered end of the bolt into the selected socket.

The upright 17 is of substantially channel-shaped cross-section and includes a face portion 33 reinforced on the rear side thereof with spaced webs 34 and 35 arranged on the respective sides of the trunnion bolt 13 previously described. Diverging from the vertical edges of the face portion 33 are wings 36 and 37 having flat front faces 38 and inclined rear faces 39 cooperating to form dovetail guides or ways 40 and 41 coextensively with the height of the upright and which mount a horizontally extending arm 42. The arm 42 includes a channel-shaped body having sides 43 and 44 connected by an arch-shaped web 45. The lower edges of the side walls are flanged inwardly, as at 46, but terminate short of each other to provide a longitudinal slot 47. The rear end of the arm terminates in a clamp plate 48, having a face portion 49 slidably engaging the flat faces 38 of the guides and provided with rearwardly directed flanges 50 and 51 on the side edges thereof of suitable width to extend over the dovetail guides, the flanges being provided with grooves 52 having inclined faces 53 corresponding to the angle of the dovetail guides whereby the arm is retained at all times at right angles to the upright and free of lateral play. The plate portion of the clamp is slotted at a point intermediate the flanges, as indicated at 54, to provide flexibility whereby the flanges 50 and 51 may be drawn into clamping engagement with the guides by clamping bolts 55 and 56 extending transversely through the respective ends of the clamp plate as clearly shown in Fig. 2.

The arm is preferably raised and lowered upon the upright by a screw mechanism, best illustrated in Fig. 7. Fixed to the flanges of the face plate and bridging the webs of the upright is a bracket 57, including a bar portion 58 having legs 59 terminating in foot flanges 60 that are secured to the flanges 50 and 51 of the face plate by fastening devices 61. Extending forwardly between the webs 34 and 35 of the upright is a tongue 62 having an internally threaded opening 63 located substantially in the extended axis of the trunnion plate 2, and in which a screw-shaft 64 turns. The lower end of the screw-shaft is rotatably fixed within a lug 65 extending rearwardly from the face web 34 of the upright 17. Fixed on the screw-shaft is a bevelled gear 66 which meshes with the bevelled gear 67 on a crank-shaft 68, the crank-shaft having its ends journalled in suitable bearings in the webs 34 and 35 and provided with a crank 69 by which the shaft may be rotated to effect rotation of the screw-shaft. Rotation of the threaded shaft within the threaded opening 63 of the bracket 57 raises and lowers the arm 42 on the upright 17, depending upon the direction of crank rotation.

Formed along the lower edges of the sides of the arm 42 are ribs 70 and 71 having coextensive grooves 72 and 73, preferably of V-shaped cross-section, to mount rails 74 and 75. The rails 74 and 75 are of rectangular cross-section and are arranged so that one of the corners of each seats within the V-shaped grooves 72 and 73, the rails being secured in the grooves by cap-screws 76, as shown in Fig. 8, so that they form a rigid part of the arm. The upper and lower corner edges 77 and 78 of the rails constitute V-shaped tracks for mounting a motor carriage 79. The carriage includes a plate-like body portion 80, having upwardly extending sides 81 and 82 spaced apart a sufficient distance to accommodate the horizontal arm 42 therebetween as shown in Fig. 8. The ends of the plate-like body are slotted in registry with the rails, as at 83, to accommodate rollers 84—85 and 86—87, which are journalled in the respective slots on stub-shafts 88 (Fig. 9). The stub-shafts 88 are carried on eccentrics 89 that are adjustably mounted in openings 90 of the carriage body. One side of the eccentrics is notched, as at 91 (Fig. 10) to provide shoulders 92 engaged by adjusting screws 93, the adjusting screws being threaded into suitable openings offset with respect to the axis of the respective eccentrics. With this arrangement it will be noted that by tightening the screws the eccentrics are caused to be rotated to raise the rollers into contact with the lower tracks thereby removing play of the carriage on the arm.

Cooperating with the pairs of rollers just referred to, are pairs of rollers 95—96 and 97—98 spaced thereabove, three of which are mounted on fixed stub-shafts 99 and the fourth on an eccentrically mounted stub-shaft 100 similar to the lower rollers previously described.

The rollers are all of the same construction and include inner races 101 mounted on the respective stub-shafts and outer races 102 for antifriction bearings 103. The outer races 102 have the peripheries thereof provided with V-shaped annular grooves 104 with the side faces 105 and 106 corresponding to the diverging angle of the faces of the guide tracks whereby, when the rollers are adjusted by means of the eccentrics, they retain the carriage from vertical and lateral movement with respect to the arm 42. The carriage, however, is free to roll back and forth on the arm as later described.

Formed in the under face of the body portion of the carriage is a conical recess 107, having a tapered annular wall 108 in which is mounted a clamping disk 109, the disk 109 having a face 110 corresponding to the taper of the wall 108 so that it may be drawn tightly thereagainst by a clamping mechanism which includes a bolt 111, having the shank 112 thereof projecting through axial openings 113 and 114 in the clamping disk and carriage body respectively. The bolt is provided with a head 115 that cooperates with a clamping nut 116 to draw the disk into clamping engagement with the conical recess, the nut being provided with a handle 117 whereby it may be readily manipulated. Depending from the lower face of the clamping disk are bracket arms 118 and 119, the arm 118 having a lateral flange 120 at its upper end that is rigidly secured to the clamping disk by fastening devices 121, and the arm 119 having a similar flange 122 provided with slots 123 through which fastening devices such as cap-screws 124 are extended to secure the arm 119 so that the arm 119 is adjustable to and from the arm 118 to accommodate a motor 125 of different size.

The motor 125 has trunnions 126 and 127 extending from opposite diametrical sides thereof as shown in Fig. 5. The trunnion 126 is of larger diameter than the trunnion 127, and has a bevelled periphery 128 adapted to be drawn tightly in a conical recess 129 in the inner face of the arm 118. The other trunnion, however, is freely movable in an aligning opening 130 in the arm 119. The motor is thus mounted for swinging movement on a horizontal axis to vary the angle of the cutting tool that may be mounted on the end 131 of the armature shaft 132 as in conventional practice.

In order to retain the motor in adjusted position, the trunnion having the bevelled portion carries a threaded stud 133 that projects through an opening 134 in the arm 118 and mounts a clamping nut 135 by which the bevelled portion of the trunnion may be drawn tightly into the conical socket, thereby retaining the motor in any desired angular position.

By means of the clamping disk 109, the motor is also adapted to be adjusted about a vertical axis. This is effected by loosening the clamping nut 116 and rotating the clamping disk through the handle 117 which acts as a lever. In order to prevent relative movement between the clamping disk and the bolt 111, the clamping disk carries a set-screw 136, having the end thereof operable in one of a plurality of grooves 137, formed in the shank 112 of the bolt as shown in Fig. 8. To supplement clamping action of the disk 109 so that the motor is rigidly retained in a selected adjusted position, the disk also carries a spring-pressed bolt 138, similar to the bolt 24 previously described, and which is adapted to engage one of a circular series of sockets 139 formed in the bottom of the conical recess 107.

If desired the various positional adjustments may be indexed with protractor scales, for example the trunnion plate 2 may have a protractor scale as indicated at 140 (Fig. 1) and the turntable 16 may be provided with a sight opening 141 through which the graduations of the protractor scale are exposed and aligned with a mark 142. Likewise the motor trunnion 126 may have a protractor scale 143 which is readable through a window opening 144 in the arm 118. To facilitate movement of the carriage along the tracks of the arm 42 as, for example, in cutting grooves, mouldings, and the like, the arm 118 may be provided with a handle 145 as shown in Figs. 4 and 5.

In using the motor mounting constructed and assembled as described, the trunnion plate 2 is secured by fastening devices 6 to a work table 5 so that the upright or standard 17 is anchored in a fixed location but is adapted to rotate thereon to readily position the horizontal arm through an angle of 360° over any selected portion of the table. When the horizontal arm 42 is moved to its desired position the bolt 24 is moved into the registering socket 28 which retains the position of the standard. The arm is then vertically adjusted on the standard 17 by loosening the bolts 55 and 56 and rotating the crank 69 in the proper direction. After the desired adjustments the bolts are retightened to rigidly retain the arm at the desired elevation. The angular relationship of the motor axis is then adjusted by freeing the bolt 138 and loosening the nuts 116 and 135. The clamping disk 109 is then rotated and the motor rocked on its trunnions 126 and 127 to bring the axis of the armature shaft at the desired angle, after which the nuts 135 and 116 are retightened.

In case wear should occur between the tracks and rollers, this may be readily removed by manipulating the eccentric set-screws 93 to move the rollers closer to the guide tracks.

At times it may be desirable to fix the carriage upon the supporting arm. This may be effected by a "C" clamp 146 which is pivoted on the end of the carriage and clamps to one of the rails, as shown in Fig. 4.

From the foregoing it is obvious that we have provided a motor mounting which is thoroughly universal as to the positions in which a tool carried by the motor may be positioned, and which is rigidly retained in adjusted position so as to assure accuracy of tool operation, free of chatters and other imperfections ordinarily caused by insecure motor mountings.

It is also obvious that the motor is rigidly supported for movement on the arm as when cutting rabbets, moulding, grinding grooves, making saw cuts and the like, depending upon the type of tool and the nature of the work to be accomplished.

What we claim and desire to secure by Letters Patent is:

1. In an apparatus of the character described, an arm having longitudinally arranged V-shaped seats on opposite sides thereof, guide bars of rectangular cross-section providing diverging side edges seated in said V-shaped seats and having upper and lower converging faces providing oppositely facing substantially V-shaped track portions substantially coextensive with said arm, means securing the guide bars in said V-shaped seats, a carriage having side members overlapping opposite sides of the arm and extending over the guide bars, a plurality of spaced rollers carried by the side members above said bars and having V-grooved peripheries engaging with the upper V-shaped track portions of said bars to suspend the carriage for rolling support on the arm, and a plurality of rollers carried by said side members below the guide bars and having V-grooved peripheries engaging the lower V-shaped track portions of said bars.

2. In an apparatus of the character described, an arm having longitudinally arranged V-shaped seats on opposite sides thereof, guide bars of rectangular cross-section providing diverging side edges seated in said V-shaped seats and having upper and lower converging faces providing oppositely facing substantially V-shaped track portions substantially coextensive with said arm, means securing the guide bars in said V-shaped seats, a carriage having side members overlapping opposite sides of the arm and extending over the guide bars, a plurality of spaced rollers carried by the side members above said bars and having V-grooved peripheries engaging with the upper V-shaped track portions of said bars to suspend the carriage for rolling support on the arm, a plurality of rollers carried by said side members below the guide bars and having V-grooved peripheries engaging the lower V-shaped track portions of said bars, and means selectively spacing the upper and lower rollers for removing any play which may occur between the rollers and said V-shaped track portions.

3. In an apparatus of the character described, an arm having coextensive ribs projecting outwardly from opposite sides thereof and provided with coextensive V-shaped seats, guide bars of rectangular cross-section providing diverging side edges engaged in said V-shaped grooves and upper and lower converging faces providing oppositely facing V-shaped track portions substantially coextensive with the arm, fastening devices extending through said ribs and into the guide bars for drawing the guide bars into contact with said V-shaped grooves, a carriage having side members overlapping the sides of the arm in spaced relation therewith, a plurality of spaced rollers carried by the side members above said bars and having V-grooved peripheries engaging the upper V-shaped track portions of said bars to suspend the carriage for rolling support relative to the arm, and a plurality of rollers carried by the side members below the guide bars and having V-grooved peripheries engaging the lower V-shaped track portions of said bars.

4. In an apparatus of the character described, a substantially channel-shaped arm to provide depending flanges, ribs projecting outwardly from said flanges and provided with substantially V-shaped grooves extending longitudinally thereof, rectangular-shaped bars having corner edges engaged in said grooves, fastening devices extending through the flanges of said arm and into threaded sockets of the bars to draw the corner edges of the bars into rigid engagement with said V-shaped grooves, a carriage having upwardly extending sides overlapping the flanges of said arms in spaced relation with the guide bars, a plurality of rollers journalled on the sides of the carriage above the guide bars and having V-grooved peripheries engaging upper corner edges of the bars, and a plurality of rollers carried by the sides of the carriage below the guide bars and having V-grooved peripheries engaging the lower corner edges of said bars.

HARRY I. WILSON
HARRY R. WILSON.